Nov. 12, 1968   J. L. FERGASON ET AL   3,410,999
DISPLAY SYSTEM UTILIZING A LIQUID CRYSTALLINE MATERIAL
OF THE CHOLESTERIC PHASE
Filed June 29, 1965   2 Sheets—Sheet 1

United States Patent Office 3,410,999
Patented Nov. 12, 1968

3,410,999
DISPLAY SYSTEM UTILIZING A LIQUID CRYSTALLINE MATERIAL OF THE CHOLESTERIC PHASE
James L. Fergason, Penn Hills, Verona, and Arthur E. Anderson, Pittsburgh, Pa., assignors to Westinghouse Electric Corporation, Pittsburgh, Pa., a corporation of Pennsylvania
Filed June 29, 1965, Ser. No. 467,851
9 Claims. (Cl. 250—43.5)

ABSTRACT OF THE DISCLOSURE

A large area display screen is provided which includes a layer of liquid crystalline material of the cholesteric phase in which a temperature image is applied thereto according to electrical information by means of lossy elements provided in intimate contact with the liquid crystalline material. The lossy elements may be in the form of resistive elements of nonlinear characteristics.

---

This invention relates to apparatus for and methods of display of an electromagnetic wave energy.

There are several systems capable of displaying an electromagnetic wave pattern or image such as a standard television receiving system. A standard television system relies primarily on adding energy to an electron beam which has been modulated in intensity in accordance with the picture information to be displayed. In large area display devices, practical limitations of beam current density and voltage impose an upper limit on the brightness of the display. Another technique which is currently being studied is electroluminescent phosphor display devices. The electroluminescent display screens have found to be very inefficient as far as light output from the electroluminescent material and also the associated control means for displaying the image has been found to be extremely complicated and expensive.

The present invention comprises a simplified system for providing a high intensity display. Unlike the conventionally fabricated screens, the display screen utilizes a suitable material such as a liquid crystalline material of the cholesteric phase in which the brightness of the display is proportional to the amount of viewing light including ambient lighting directed onto the screen. The liquid crystalline materials of the cholesteric phase exhibits curious changes in light reflecting properties when heated or cooled through a transition region near their melting point. The changes in reflectivity are manifested as changes in color when the viewing source is of white light. The material is substantially colorless at temperatures well above its melting point but as it is cooled and becomes more viscous it goes through a transition region in which it appears blue, then green, then yellow, then red and finally colorless again as viewed in reflective white light. If cooled sufficiently, the viscous liquid is converted to a colorless crystalline solid. The color changes occur at definite, reproducible temperature differences within a range of temperatures which may be made relatively broad or narrow by adjusting the formulation of the cholesteric liquid crystalline material.

The optical scattering properties of the cholesteric liquid crystalline layer can be modified by providing in intimate contact therewith elemental driving elements to provide localized temperature control. Thus for a given cholesteric liquid crystalline material a suitable temperature can be found to give an overall background color such as red or yellow in reflected white light and then by elevating the temperature of localized spots or areas these may be made to appear blue or green on the contrasting red or yellow background. By utilizing monochromatic viewing light, single color contrast may be obtained on a given background and brightness alone will vary with temperature change.

The cholesteric film scatters only one wavelength at one angle of the viewing light. Cholesteric liquid crystal films absorbs almost no energy so that the light energy directed thereon is either transmitted or reflected. At selected wavelengths and with the viewing light directed onto the film at the normal angle of incident, about fifty percent of the incident radiation is scattered. At larger angles of incidence, the amount of energy reflected or scattered increased and the peak (wavelength of maximum scattering) shifts toward the shorter wavelengths.

If the temperature of the liquid crystalline film is varied, the peak of reflection is shifted to shorter wavelengths with increase in temperature. This temperature effect is completely reversible. At any temperature the wavelength of maximum scattering depends on the sum of the incident angle of the incident viewing light and the angle of observation.

Liquid crystals of the cholesteric phase have many important optical properties. The cholesteric phase is a state exhibited by many organic materials. It is a member of a large system or class of states called liquid crystalline or mesomorphic indicating a condition or order intermediate between a true crystal and a liquid. For the most part, cholesteric liquid crystals are formed by derivatives of sterols, although they are by no means limited to these compounds. The properties of cholesteric crystals and suitable materials for this invention are more fully discussed in U.S. Patent 3,114,836 by Fergason et al. and assigned to the same assignee as this invention.

It is accordingly, an object of this invention to provide an improved system capable of providing a high intensity display.

It is still another object to provide an improved display system capable of providing display in a plurality of colors.

It is another object to provide an improved device for distributing a heat image onto heat sensitive display screen.

Briefly, the present invention accomplishes the above cited objects by providing a display screen including a layer of liquid crystalline material of the cholesteric phase in which a temperature image is applied thereto according to electrical information by means of lossy elements (elements that generate heat in response to application of electrical energy) in intimate contact with the liquid crystalline material. Switching means is associated with the lossy elements in order to distribute the information to the desired area of the display screen. A high intensity light image is directed onto the liquid crystalline material and the variation of the reflection properties on the liquid crystalline material in response to the heat image provides a visual image by a reflection.

Further objects and advantages of the invention will become apparent as the following description proceeds and the features of novelty which characterize the invention will be pointed out in particularly in the claims annexed to and forming a part of the specification.

For a better understanding of the invention, reference may be had to the accompanying drawings in which.

Figure 1:
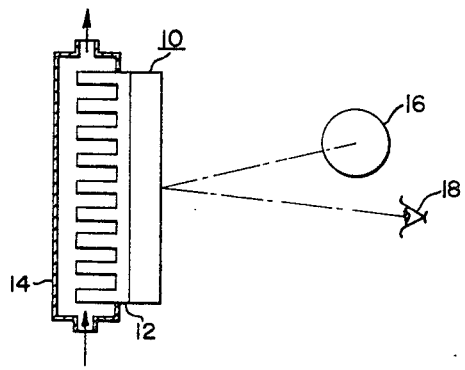
FIGURE 1 illustrates a display system embodying the principles of this invention.

Referring in detail to FIG. 1, a system is shown including a display screen assembly 10. The screen assembly 10 is provided with a heat sink 12 on one surface with an associated temperature control means 14. The temperature control means 14 consists of an enclosure on one surface of heat sink 12 with means for permitting flow of a liquid medium such as water over the surface of the heat sink 12. The temperature of the water may be controlled to the desired operating temperature. A thermoelectric temperature control system may be employed for controlling the operating temperature.

The display screen 10 is illuminated with a light source 16. The source may be of white light or monochromatic depending on the particular application. The display on the screen 10 may be observed by an observer 18.

Figure 2:
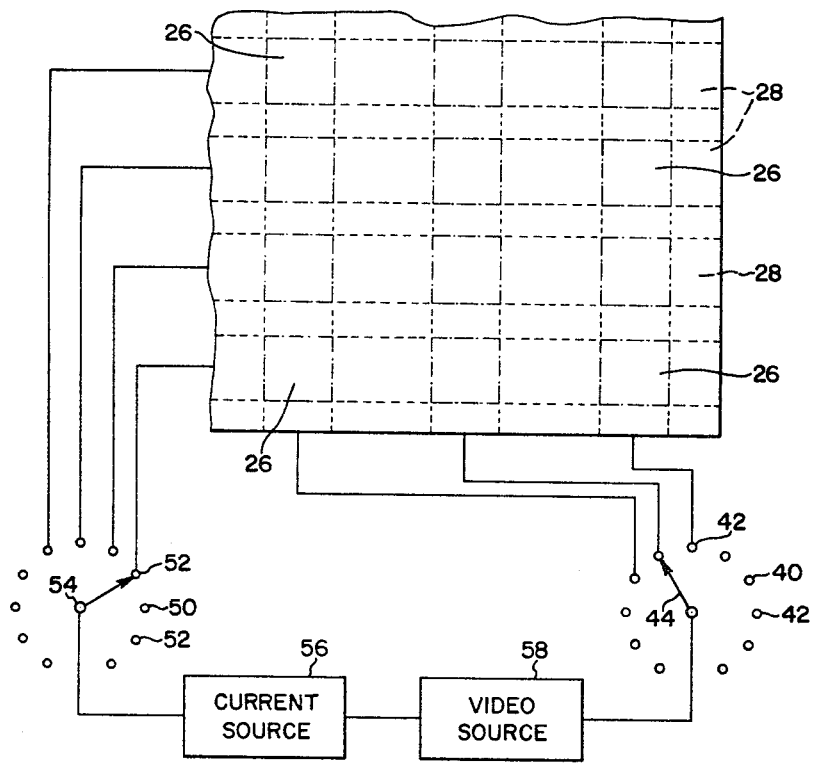
FIG. 2 is an enlarged view of a portion of the screen shown in FIG. 1.
Figure 3:
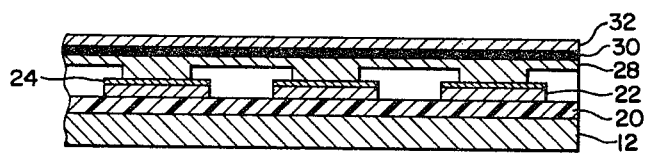
FIG. 3 is a sectional view of a portion of the screen shown in FIG. 1.

The display screen structure 10 is shown in detail in FIGS. 2 and 3. The screen structure 10 included a support layer which is the heat sink 12. The heat sink 12 is comprised of a suitable material such as aluminum and having a thickness of about 2 cm. A thermal barrier layer 20 is provided on the support layer 12 and may be of a suitable material such as polyethylene terephthalate and known under the trade name Mylar. This film or layer 20 may be applied and secured to the support layer 12 by a suitable adhesive. The thickness of the layer 20 may be about 25 microns. The function of the thermal insulating layer 20 is to provide a thermal barrier layer to provide a time delay in thermal conduction from the heat sensitive screen to the heat sink 12 so as to provide a proper time constant for the screen structure. The material and thickness of the layer 20 may be varied to obtain a desired time delay.

A plurality of electrically conductive strips 22 shown as vertical columns are provided on the layer 20 and may be of a suitable electrically conductive material such as aluminum. The conductive strips 22 should be of a thickness of about 100 angstroms and the width of about 400 microns. The spacing between the conductive strips 22 should be about 100 microns. Positioned on the conductive strips 22 is heating layer 24 of a suitable lossy material. In the specific embodiment a resistive material such as selenium, magnesium oxide or aluminum oxide is provided in the layer 24 and having a thickness of about 25 microns. The coating 24 may be evaporated and provided on the entire conductive strip 22, as a continuous layer or simply on active areas 26 of the screen as illustrated in FIG. 2. Positioned on the exposed surface of the resistive layer 24 are electrically conductive strips 28 to provide a non-linear resistor within the active areas 26. The resulting structure consisting of the conductive electrodes 22 the resistive layer 24 and the conductive electrode 28 is to provide a matrix of the non-linear resistive elements or active areas 26.

A coating 30 is provided on the conductive strips 22 as a continuous coating and may be of a suitable black paint such as India ink to provide a black surface. A layer 32 of a liquid crystalline material of cholesteric phase is provided on the black coating 30. A suitable material for the liquid crystalline layer 26 is a mixture including 60 percent by weight of cholesteryl monanoate, 30 percent by weight of oleyl cholesteryl carbonate and 10 percent by weight of cholesteryl benzoate. There are other suitable materials and mixtures that exhibit the change in reflecting properties in response to heat such as described in the previously mentioned U.S. Patent 3,114,836.

The conducting strips 22 are connected to a switching member 40 and as indicated each of the conducting strips 22 would be connected to a separate terminal 42 of the switching device 40 with a rotor 44 provided for making contact to selected terminals 42. A similar switching system 50 is provided in which terminals 52 thereof are connected to the conducting strips 28 with a rotor 54 provided for connecting to any of the desired terminals 52 and associated strips 28. The rotors 44 and 54 are connected together through a suitable current source 56 and a video source 58. In this manner, the necessary current may be applied across a selected active area 26 to provide heating. The switching units 40 and 50 have been shown as simple mechanical switching arrangements for convenience of illustration and it is understood that any suitable scanning or selecting arrangement might be utilized. The scanning system for a display would normally require that it be capable of providing a standard television scan. It might be desirable to utilize a simple cathode ray tube with special fiber optics face plate to provide the desired control signals to actuate semiconductor devices or glow discharge switches associated with the conductive elements 22 and 28. Various other switch end devices might be used to control the current flow through selected areas 28.

Figure 5:
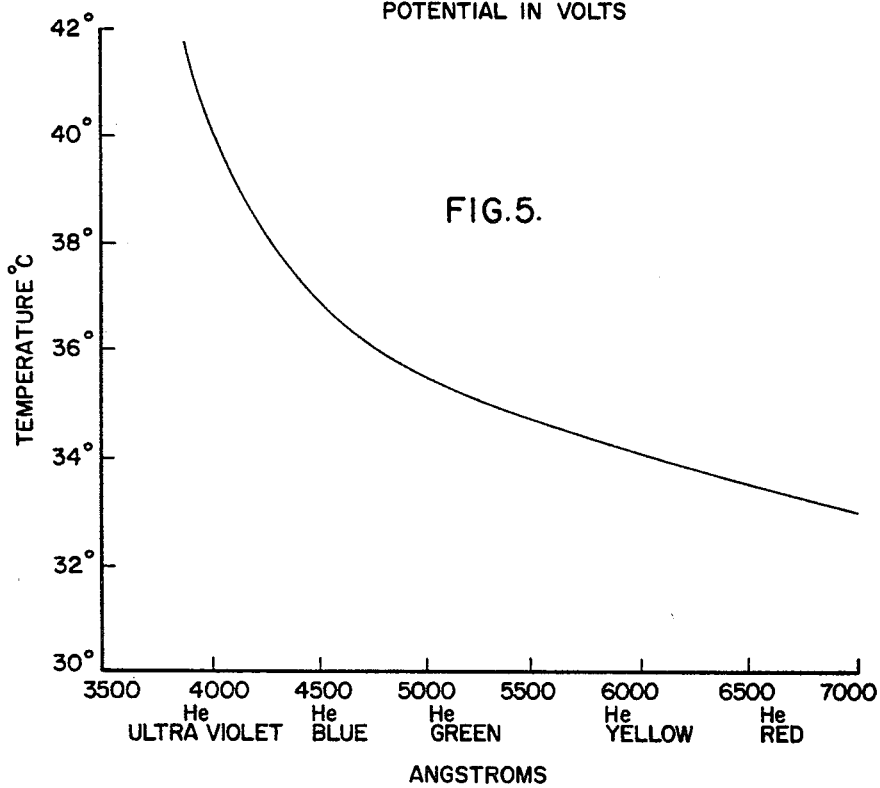
FIG. 5 is a curve illustrating hte reflective properties of the screen shown in FIG. 1.

In the operation of the device shown in FIGS. 1, 2 and 3, the active elements 26 are heated by coincident technique. The ambient temperature of the display screen 10 is controlled by the control means 14. The ambient temperature of the liquid crystal layer 32 associated with the element 26 for this specific material will be at 32° C. Light directed onto the display screen 10 from the viewing light source 16 will cause the screen 10 to look black to the observer 18 due to the fact that the light is not reflected from the liquid crystal layer 32 but from the black coating 30. In order to display an image, heat must be applied to the elements 26. The heat may be applied a given middle resistive active element 26 and specifically the element 26 in the bottom row, the switch 50 would be connected to the terminal 52 as shown in FIG. 2 and the switch 40 would be connected to the terminal 42 as shown in FIG. 2. A current corresponding to the source 56 and the video source 58 would be applied across the element 26. The current flowing in the resistance layer 24 of the element 26 would cause heating in accordance with the amount of current. Since a resistance of the area 20 is non-linear, the ratio of power dissipated will be 100 or more. If the temperature of the elemental area 26 is raised to a temperature of 33.5° C. then a red color will be reflected by the screen 10, at a temperature of 34° C. a yellow color, at a temperature of 35.5° C. a green color, at a temperature of 37° C. a blue color and at a higher temperature the structure will again be black to the observer. By the amount of current flow, the color may be controlled. This property of the screen 10 is illustrated by the curve shown in FIG. 5. nI this manner, a color visual image can be displayed of contrasting colors or by controlling the temperature by current flow, the image may be made to appear in a single color on another color background. The above description is directed to the use of a light source 6 of white light. If a monochromatic light source is used then a single color can be obtained so as to obtain a brightness variation within a single color on a black background.

Figure 4:
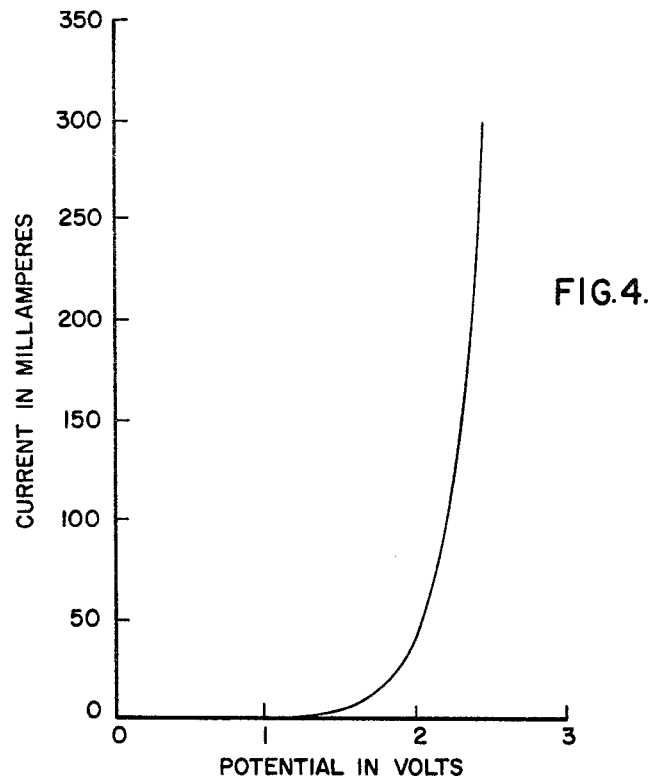
FIG. 4 is a curve illustrating the properties of the non-linear resistive element shown in FIG. 1.

A typical characteristic curve for the non-linear resistive element 24 is illustrated in FIG. 4. By utilization of the non-linear device, one is able to insure that power will not be dissipated in adjacent elements but will be applied across the single element where substantial conduction is found due to the fact that a greater voltage is applied across this element rather than the other elements. By providing the temperature barrier layer 20, one is able to control the amount of time that the heat image is applied to the liquid crystalline layer 32. Although the suggested scanning method does not provide for a storage type display, it recognized that the proposed display screen is adaptable to other scanning structures which incorporates both storage and selective erase.

While there have been shown and described what are at present considered to be the preferred embodiments of the invention, modifications thereto will readily occur to those skilled in the art. It is not desired, therefore, that the invention be limited to the specific arrangements shown and it is intended to cover in the appended claims all such modifications as fall within the true spirit and scope of the invention.

We claim as our invention:

1. A display system comprising a display screen, said display screen comprising a layer including a cholesteric liquid crystalline material, said cholesteric liquid crystalline layer exhibiting the property of different optical properties at different temperatures, means for applying a heat pattern to said cholesteric liquid crystalline layer, said means including a plurality of lossy elements positioned in thermal conductive relationship with said cholesteric liquid crystalline layer and means for applying electrical energy by electrically conductive means selectively to said lossy elements and generate a heat pattern and means for directing light onto said cholesteric liquid crystalline layer for generating a light pattern corresponding to said heat pattern.

2. A display system comprising a display screen, said display screen including a layer of liquid crystalline material of the cholesteric phase, said cholesteric liquid crystalline layer exhibiting the property of different optical properties at different temperatures, means for applying a heat pattern to said cholesteric liquid crystalline layer, said means including a first and second electrically conductive member, means for impressing a voltage between said first and second electrically conductive members to generate heat therebetween to modify the optical properties of said cholesteric liquid crystalline layer and means for directing light onto said cholesteric liquid crystalline layer to provide a visual display of the change of optical properties of said cholesteric liquid crystalline layer.

3. A display system comprising a display screen, said display screen comprising a heat sensitive layer including a cholesteric liquid crystalline material, said heat sensitive layer exhibiting the property of different optical properties at different temperatures, means for applying a heat pattern to said heat sensitive layer, said means including a plurality of resistive elements positioned in close proximity to said heat sensitive layer, electrically conductive means for causing current to flow through said resistive elements and generate a heat pattern and means for directing a light onto said heat sensitive layer for displaying a light pattern corresponding to said heat pattern.

4. A display system comprising a display screen, said display screen comprising a layer including liquid crystalline material of the cholesteric phase, said layer exhibiting the property of reflecting different wavelengths of light at different temperatures, means for applying heat to said layer, said means including a lossy element positioned in close proximity to said layer, means for applying a voltage across said lossy element for causing current to flow therein and generate heat and thereby modify the light reflective properties of said layer and means for directing light onto said layer to produce a visual indication of the change of reflective properties of said layer.

5. A display system comprising a display screen, said display screen comprising a heat sensitive layer including liquid crystalline material of the cholesteric phase, said layer exhibiting the property of reflecting different wavelengths of light at different temperatures, means for applying a heat pattern to said layer, said means including a plurality of resistive elements positioned in close proximity to said layer means for causing current to flow through selected resistive elements to generate said heat pattern and thereby modify the light reflective properties of said layer and means for directing light onto said layer to produce a visual indication of the change of reflective properties of said layer.

6. A display system comprising a display screen, said display screen comprising a sensitive heat layer including liquid crystalline material of the cholesteric phase, said heat sensitive layer exhibiting the property of reflecting different wavelengths of light at different temperatures, means for applying a heat pattern to said liquid crystalline layer, said means including a plurality of lossy elements positioned in close proximity to said heat sensitive layer, electrical means for selectively applying a voltage across said resistive elements for causing current to flow in said selected resistive elements and generate heat therein and thereby establish said heat pattern, said heat pattern modifying the light reflective properties of said heat sensitive layer and means for directing light onto said heat sensitive layer to produce a visual pattern corresponding to said heat pattern layer.

7. A display system comprising a display screen, said display screen including a layer of cholesteric liquid crystalline material, said layer exhibiting the property of change of optical properties in response to excitation control means associated with said layer for modifying the optical properties of said layer, said control means comprising a plurality of electrical conductive elements, switching means connected to said electrical conductive elements for exciting selective areas of said layer and modifying the optical properties of said layer and means for directing radiations onto said layer to provide a display of said excited selected areas.

8. A display system comprising a display screen, said display screen comprising a layer including cholesteric liquid crystalline material, means for applying an excitation pattern to said layer, said means including a plurality of non-linear electrically conductive elements for controlling the excitation of said layer, means for applying a voltage across said non-linear electrically conductive elements for causing current to flow selectively through said non-linear electrically conductive elements and generate an excitation pattern, means for directing radiations onto said layer to produce a display on said display screen due to reflection of said radiations.

9. A display system comprising a display screen, said display screen comprising a layer of liquid crystalline material, said layer exhibiting the property of different optical properties at different temperatures, means for applying a heat pattern to said layer, said means including a plurality of non-linear elements for controlling current for heating said layer, means for applying a voltage across said non-linear elements for causing current to flow selectively through said non-linear elements and generate said heat pattern and means for directing radiations onto said layer for producing a radiation display on said display screen due to reflection of said radiations.

References Cited
UNITED STATES PATENTS

| | | | |
|---|---|---|---|
| 3,103,587 | 9/1963 | Ure et al. | 250—83.3 |
| 3,114,836 | 12/1963 | Fergason et al. | 250—83 |
| 3,121,861 | 2/1964 | Alexander | 340—166 X |
| 3,219,993 | 11/1965 | Schwertz | 340—166 X |
| 3,312,979 | 4/1967 | Della Torre et al. | 340—166 X |

RALPH G. NILSON, *Primary Examiner.*

S. ELBAUM, *Assistant Examiner.*